UNITED STATES PATENT OFFICE.

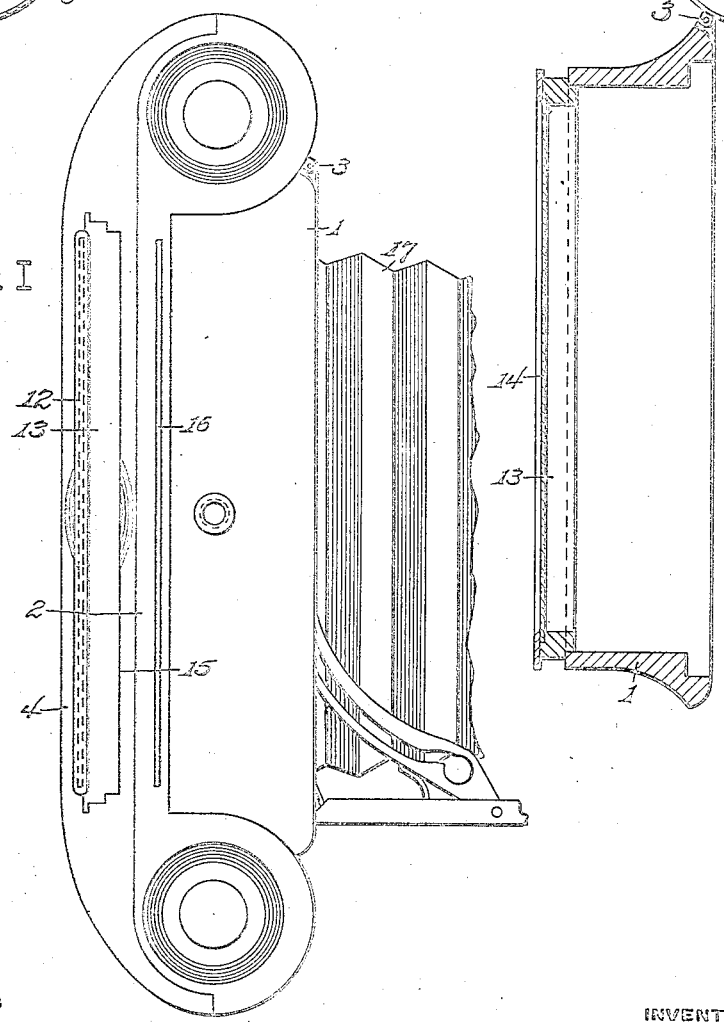

OSCAR CALLAWAY AND GEORGE R. HELSLEY, OF WELLSBURG, WEST VIRGINIA.

FILM-CAMERA.

1,229,882.  Specification of Letters Patent.  Patented June 12, 1917.

Application filed June 16, 1915. Serial No. 34,419.

*To all whom it may concern:*

Be it known that we, OSCAR CALLAWAY and GEORGE R. HELSLEY, citizens of the United States of America, and residents of Wellsburg, county of Brooke, and State of West Virginia, have invented certain new and useful Improvements in Film-Cameras, of which the following is a specification.

This invention relates broadly to photographic apparatus, and specifically to a film camera.

The primary object of the invention is to provide a camera of the film type having means whereby an accurate focus may be obtained for photographing an object.

A further object is to provide a device of the character mentioned in which a ground glass is employed for focusing purposes and which is provided with a compartment in which the ground glass and a dark slide are carried when not in use.

And a further object is to provide a film camera in which a portion containing the film may be made light-tight and removed from the main body portion for permitting the insertion of a ground glass in precisely the same position normally occupied by the film, thereby enabling an accurate focus to be obtained upon an object preparatory to photographing same.

With these and other objects in view, the invention resides in the features of construction, arrangement of parts and combinations of elements which will hereinafter be exemplified, reference being herein had to the accompanying drawings, forming a part of this specification, in which—

Figure 1 is a side elevation of a camera embodying the invention; and—

Fig. 2 is a longitudinal section of the same, shown in open position.

Referring to said drawings, in which like designating characters distinguish like parts throughout the several views—

1 indicates the body or bellows-receiver of a camera of the film type, and 2 a film-carrying frame, the latter being preferably hinged at one end to one end of the body 1, as at 3, or said frame may be so connected to said body that it may be bodily removed therefrom. A cover 4 is so fitted to the rear of said frame 2 that it is readily removable to permit of the introduction of a sensitized film 5 of the usual form, spool-receiving pockets 6 being provided at each end of said frame. Said cover is normally held in light-tight relation to said frame 2 by suitable retaining means, as interengaging catch-members 7 and 8 provided at one end and interengaging spring clasps 9 and 10 provided at the opposite end.

Provided in the cover 4 is a pocket 11 designed for receiving a dark slide 12 of usual form and also for receiving a substantially rectangular frame 13, the latter having a ground glass 14 mounted therein, and said slide and said frame 13 being insertible in said pocket through an opening 15 provided therefor in the side of said cover. Said pocket constitutes a receptacle in which said slide and said frame are conveniently received and carried when not in use.

In practice, when it is desired to accurately focus the camera upon an object, the dark slide 12 is removed from the pocket 11 and placed in a slideway 16 which is provided in the frame 2 immediately in front of the film 5, thereby closing the front of the film-carrying frame 2 and rendering the same perfectly light-tight. Said frame 2 is then swung back on the hinge 3 to substantially the position shown in Fig. 2, whereupon the frame 13 which contains the ground glass 14 is removed from the pocket 11 in the cover and is fitted closely within the rear end of the opening through the body 1, thus enabling the object which is to be photographed to be accurately focused on said ground glass in the manner usual to plate cameras. While the parts are in this position, the ground glass occupies precisely the same plane with respect to the body 1 and lens (not shown) which is occupied by the film when the cover and body are disposed in their nomal relation. After said focus has been accurately adjusted by positioning the lens carried by the foldable bellows 17, the frame 13 is removed from the body 1 and placed in its carrying position in the pocket 11. The film-carrying frame 2 is then swung into normal position; and, finally, the slide 12 is removed from the slideway 16 and is returned to its carrying position in the pocket 11. The camera is then in readiness for making the desired exposure.

We have described the invention in what we consider to be its simplest form. It is obvious, however, that various changes may be made in the construction and arrangement of parts without departing from the general spirit or scope of the invention as defined in the appended claims.

What is claimed is—

1. A film camera comprising a casing having a roll film-containing compartment extending forwardly at each end therefrom, said casing being designed for receiving a light excluding member in front of the film space thereof and between the forwardly extending film-containing compartments, a body portion having a hinged connection at one end with the forward and inner side portion of one film-containing compartment and having its other end free whereby the free end of the casing with its other compartment may be swung from the body portion to serve as a dark screen therefor, said casing when closed against the body portion receiving the latter in a nesting manner between the forwardly extending compartments.

2. A film camera comprising a casing consisting of a film-carrying frame having end spool-receiving pockets and a cover for the frame removably secured thereto and defining therewith the pockets, said cover being double-walled and including a pocket between the walls thereof designed to receive a screen and light-excluding member, and said frame being also designed to receive a light-excluding member, and a body portion having hinged connection at one end with one of the spool-receiving pockets and adapted for being normally received between the latter when the casing is closed against the body, said body being designed to receive a screen, and said casing serving as a dark screen for the body when the casing is swung away from the latter.

In testimony whereof we affix our signatures in presence of two witnesses.

OSCAR CALLAWAY.
GEORGE R. HELSLEY.

Witnesses:
WM. COCKRELL,
H. E. DUNLAP.